United States Patent [19]

Molaug et al.

[11] Patent Number: 5,009,908
[45] Date of Patent: Apr. 23, 1991

[54] METHOD OF PELLETING DRY PELLETS FROM A MIXTURE CONTAINING THERMO-HARDENED INGREDIENTS, PARTICULARLY FOR USE AS FISH FEED, AND THE MACHINE FOR CARRYING OUT THE PROCESS

[75] Inventors: Ole Molaug, Bryne; Steinar Risa, Undheim, both of Norway

[73] Assignee: Akva A/S, Bryne, Norway

[21] Appl. No.: 431,553

[22] Filed: Nov. 2, 1989

[30] Foreign Application Priority Data

Nov. 7, 1988 [NO] Norway ............................ 884953

[51] Int. Cl.$^5$ ................................ A23B 4/03
[52] U.S. Cl. ................................ 426/454; 426/518; 426/520; 426/524; 426/805; 264/109; 264/118

[58] Field of Search .................. 426/2, 524, 454, 520, 426/516, 805, 807, 518; 425/378.1, 376.1, 377, DIG. 230; 264/209.3, 163, 140-144, 109, 118

[56] References Cited

U.S. PATENT DOCUMENTS 4,886,440  12/1989  Forrest et al. .................. 425/378.1
4,897,236  1/1990   Rabiger et al. ................. 425/378.1

*Primary Examiner*—R. B. Penland
*Attorney, Agent, or Firm*—Ladas & Parry

[57] ABSTRACT

Method and machine for pelleting dry pellets from the mass (11) containing thermo-hardening substances, particularly for use as fish feed, where the mass is first compressed and then heated to a thermo-hardening temperature and finally cooled. The bi-products from heating, such as fat, other liquids or gas, are drained off in or near the heating zone (6) and are brought in contact with and thereby returned to the thermo-hardened mass after this has been cooled.

24 Claims, 1 Drawing Sheet

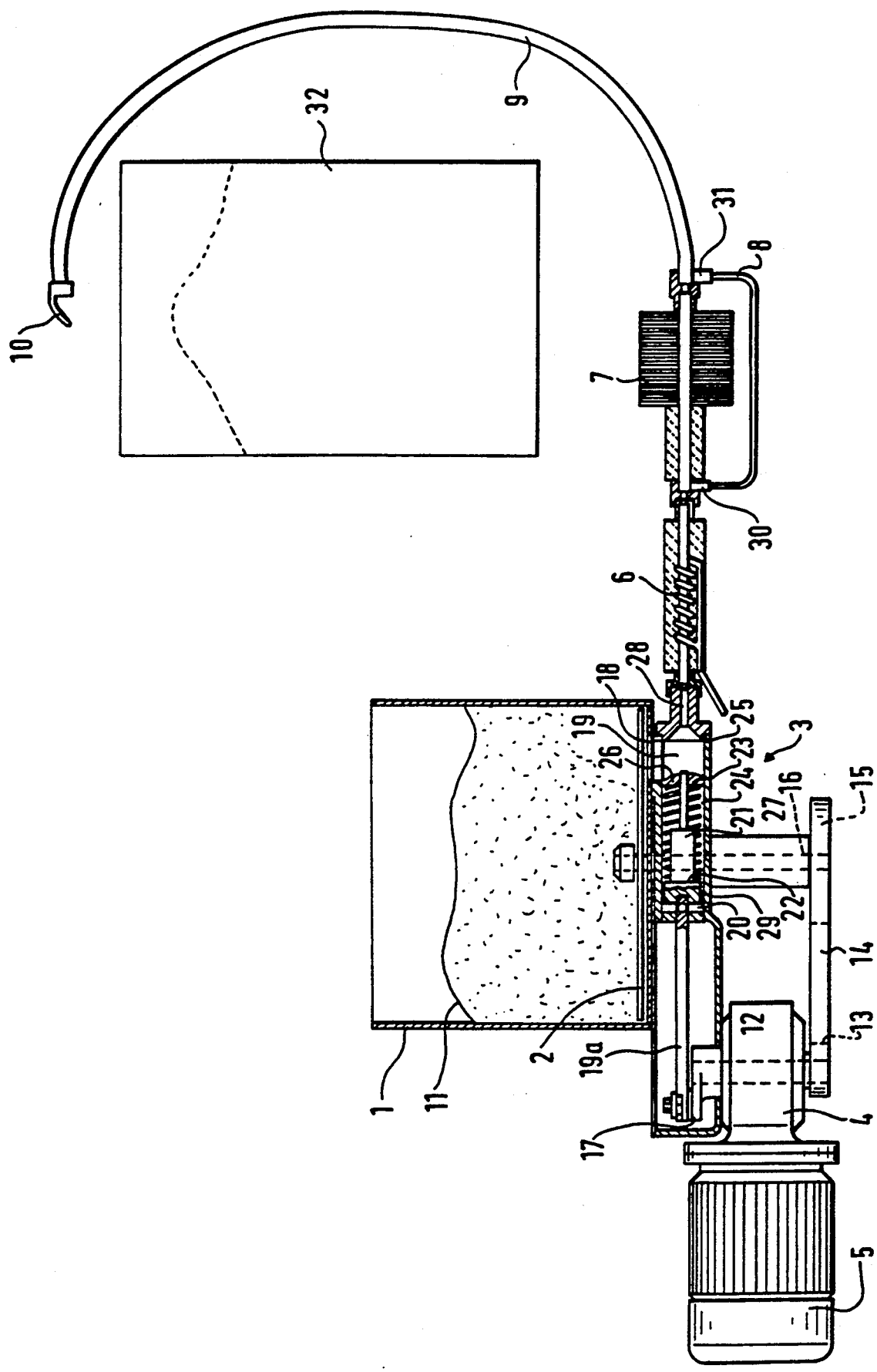

METHOD OF PELLETING DRY PELLETS FROM A MIXTURE CONTAINING THERMO-HARDENED INGREDIENTS, PARTICULARLY FOR USE AS FISH FEED, AND THE MACHINE FOR CARRYING OUT THE PROCESS

TECHNICAL FIELD OF THE INVENTION

Background of the Invention

This invention concerns the method of pelleting dry pellets from a mixture containing thermo-hardened ingredients, particularly for use as fish feed, and the machine for carrying out the process.

Fish in fish farms are fed with pelleted feed. So-called dry pellets are predominantly used.

Fish feed factories produce dry feed and deliver this ready pelleted to the fish farm.

The use of dry pellets presents a handling problem, since the pellets crumble under mechanical pressure. The producers are looking for a compromise between mechanical strength and digestibility.

During packing at the factory and transport and handling by the fish farmer, some of the pellets crumble into small pieces or dust.

This dust represents a problem for the fish farmer for several reasons.

The dust is not eaten by the fish and therefore gives no growth. Therefore, the dust represents a direct financial loss.

The dust pollutes the sealed under the fish farm and the surrounding shores.

The dust is a health hazard to the fish, since it gets caught in the fish's gills.

In order to reduce the negative effects of the dust, it has become more and more usual that the feed is sieved before it is given to the fish. This reduces the risk of pollution and fish death.

In a normal fish farm, with a yearly production of 200 tons of fish, one can expect that between 100 and 200 kg of dust are deposited daily. Due to reasons of hygiene the fish feed producers no longer receive dust for recycling. Therefore, the dust represents a noticeable financial loss. The value of this is equivalent to at least one man's salary.

Fish farmers have tried to utilize the feed dust in different ways. Some have sold it to other fish farms as feed with so-called soft pellets. Here, the dust has been mixed in with the mass before pelleting. This is less acceptable today because of the risk of cross-infection.

Some have invested in relatively expensive equipment to produce small amounts of soft pellet on their own fish farms, while others have tried to use the dust as livestock feed.

There are several types of machines for pelleting fish feed.

A common feature of these is that the fish feed must be fed into the machine finely minced or as a dough. They produce a soft or wet pellet. The binding agents used are activated by adding water.

This is an expensive method because it requires a mixer for making a dough for pelleting. In order to get a pelletable dough, the dust must be mixed with other ingredients, including a liquid and a binding agent.

The finished pellet cannot be fed using the same equipment as the original dry pellet. In most cases feeding must be done by hand.

Soft pellets also keep considerably shorter than dry pellets.

BRIEF DESCRIPTION OF THE INVENTION

As mentioned above, this invention concerns the method of pelleting dry pellets and the machine for carrying out this method. According to the invention, the special feature of this method and machine is that pellets can be made from the dry pellet dust, without adding other ingredients. The dust contains a binding agent that can be activated by heat, and this is used to thermo-harden the mass into the required shape.

The finished pellet is like normal dry pellet and can be stored and fed in the same way. This invention can therefore reduce fish feed costs, at the same time as it eliminates a pollution problem.

The finished pellet can be transported to a fish feed store, or in fact directly to the fish. The pelleting machine can therefore be used as a feeding machine which uses the feed dust as feed.

DETAILED DESCRIPTION OF THE INVENTION

The following describes an embodiment of the invention with reference to the attached drawing, which partly in cross-section shows a pellet machine according to the invention, viewed from the side.

From the dust container 1 with a stirring arrangement 2, the dust from the dry feed is fed into pelleting unit 3. Both the stirring arrangement 2 and the pelleting unit 3 are powered via the transmission unit 4 connected preferably to an electric motor 5. The pelleting unit 3 compresses the dust and pushes it through a heating unit 6 and further through a cooling unit 7. A connecting pipe 8 between the inlet and outlet of the cooling unit 7, transports any melted fat away from the cooling unit 7. After cooling, the compressed mass goes into pipe 9, which has a suitably sharp change of direction device 10 attached to the outer end, for breaking the continuous string of compressed mass in pipe 9 into suitable lengths.

The mode of operation will be described in more detail below.

Feed dust 11 is filled in the container 1. The transmission's 4 motor 5 is started. The transmission 4 has a through-going rotating shaft 12 for power outlet. A pulley 13 mounted on one end of the shaft 12 transmits power via a belt 14 to another pulley 15 that is fitted on a shaft 16, which turns the stirring arrangement 2, so that dust 11 is fed via an opening 18 into the bottom of container 1 and then into compression chamber 19 in the pelleting unit 3.

On the other end of the shaft 12, a crank arm 17 has been fitted which is connected to a lever 19a. When the shaft 12 rotates, the lever 19a will move backwards and forwards horizontally between two limit positions. In the diagram the lever 19a is shown in one of the outer limit positions, i.e. to the left.

A cross-pin 20 in mesh with a piston 21 has been fitted to the lever 19a. The piston 21 is cylindrical, with a recess 22 which forms a support for a spring 23.

The piston 21 has been arranged so that it can move inside an external piston 24, and the spring 23, which at one end has a support against the piston's (21) recess 22, has a support against the external piston 24 with the other end. The external piston 24 has been arranged so that it can move inside the cylindrical part 25 of the pelleting unit 3.

When the lever 19a is moved to the right, the piston 21 will be pushed to the right. The spring 23 ensures that the external piston also follows with this movement. The external piston 24 will now compress dust that is inside the pelleting unit's 3 compression chamber 19. The spring 23 determines the degree of compression. The external piston 24 has been fitted with a bevel 26, which ensures that any excess dust is pushed out of the compression chamber 19 and back into the dust container 1 through the opening 18.

As the external piston 24 compresses the dust, the spring 23 will also be compressed together. A pin 27, which is an extension of the piston 21, will compress the core of the dust further into a nozzle 28.

When the lever 19a has reached its outer position, the pin 27 is well into the nozzle 28, and the dust inside the nozzle is compressed to a hard compact mass. When the piston 21 is pulled back by the lever 19a, the external piston 24 will remain in position until the cross-pin 20 drags on an extended groove 29 on the external piston 24. The cross-pin 20 will then pull both pistons 24 and 21 back to their starting position. New dust from the container will now be fed into the pelleting unit's 3 compression chamber 19.

When the lever 19a again moves to the right, the above described procedure will be repeated. The compressed mass lying in the nozzle 28 from the previous cycle, will be pressed further out through the nozzle and into the heating unit 6, where the temperature is brought to the required level for activating the binding agents in the mass. For dry fish feed dust, this temperature lies between 100 and 130 degrees celsius.

Some fat and any other products like liquid or gas will boil out off the mass when it is heated, and a draining device 30 for liquid fat and any other bi-products from heating has been fitted at the outlet of the heating unit 6. Fat in particular will boil out from the ends of the compressed, hot mass. This feature of the invention is particularly important. The fat which remains on the end surfaces of the mass acts as a division against the new mass that is compressed and fed into the heating unit 6. Crack indications appear in these divisions, so that the continuous compressed mass can eventually be broken into lengths equivalent to the throw of the piston 21.

As previously mentioned, the compressed and heated mass is fed further into cooling unit 7. When cooled, the mass shrinks and slides easily further through pipe 9. After cooling, the boiled off fat is added to the mass again by leading the boiled off fat outside the cooling unit 7 via the draining device 30, the connecting pipe 8 and a filling point 31 at the outlet of the cooling unit 7. The fat is cooled slowly at the same time as it is absorbed into the flowing mass. Without this arrangement a considerable part of the nutritious value would be lost.

After cooling, the mass flows as a continuous string through the pipe 9 to a store tank 32. Any bends in the pipe 9 will cause the continuous string to be broken into pieces. Since the mass shall be broken up, this is therefore an advantage. The change of direction guide 10, which is placed at the outlet of pipe 9, ensures that the mass breaks up into suitably small pieces.

We claim:

1. A method of forming dry pellets from a mass, including a dry mass, containing thermo-hardening substances, particularly for use as fish feed, comprising the steps of:

first compressing the mass;

next heating the compressed mass to a thermo-hardening temperature;

draining off the by-product of heating, such as fat, other liquids and gas before performing said cooling step;

finally cooling the thermo-hardened mass and bringing the drained by-products into contact with the thermo-hardened mass after the latter has been cooled off in said cooling step.

2. The method as stated in claim 1, further comprising the steps of:

forming the thermo-hardened mass into a continuous stream through a pipe (9), the outlet of which has a change of direction guide (10) which breaks the stream into pellets; and directing said pellets into a receiving area.

3. A machine for forming dry pellets from a mass, including a dry mass, containing thermo-hardening substances, particularly for use as fish feed, comprising:

a pelleting unit (3) having a piston (21) and at least one of a compression chamber (19) and at least one nozzle (28) devised for compressing the supplied mass (11);

a heating unit (6) to heat the compressed mass to a level required for activating said thermo-hardening substances in the mass;

a cooling unit (7) for cooling the heated mass;

at a draining device (30) downstream of an outlet of said heating unit (6); a filling point (31) downstream of an outlet of said cooling unit (7);

a connecting pipe (8), wherein said draining device (30) and said filling point (31) are connected to said connnecting pipe which is furnished to lead melted fat and any other by-products resulting from heating in a path to bypass said cooling unit (7) and return the by-product back to the mass; and an outlet pipe (9) connected to said cooling unit (7), though which the mass flows in a continuous stream.

4. The machine as stated in claim 3, wherein at least one of said nozzles (28) is located between said compression chamber and said heating unit.

5. The machine as stated in claim 4, further comprising a pin (27) which extends from said piston (21), said piston (21) and its associated pin (27) being activated by a crank or eccentric arrangement (17), said piston and its associated pin being devised to push the compressed mass from said compression chamber (19) into said nozzle (28).

6. The machine as stated in claim 5, further comprising a cross-in (20) and a lever (19a) connected with said crank arrangement (17).

7. The machine as stated in claim 6, wherein said piston (21) is arranged so that it can extend into an external piston (24), which is provided to compress the supplied mass in said compression chamber (19), as said pin (27) is led through a bore in the top of said external piston (24).

8. The machine as stated in claim 7, further comprising a spring (23) which has one end supported against a recess (22) on said piston (21) and the other end supported against said external piston (24).

9. The machine as stated in claim 7, wherein said external piston (24) slides into a cylinder (25) in said pelleting unit (3), and said cross-pin (20) meshes with an extended groove (29) in said external piston (24).

10. The machine as stated in claim 7, wherein the top of said external piston (24) is shaped with a bevel (26)

which ensures that any excess mass supplied to said compression chamber (19) is pushed out of said compression chamber.

11. The machine as stated in claim 10, further comprising a change of direction device (10) placed at the outlet of said outlet pipe (9), which ensures that the stream in said outlet pipe (9) must pass a bend which is sharp enough to break the stream into individual pellets.

12. A machine for forming dry pellets from a mass, including a dry mass, containing thermo-hardening substances, particularly for use as fishfeed, utilizing combined heat, compression and cooling, comprising:
   means for first compressing the mass;
   means for heating the compressed mass to a thermo-hardening temperature;
   means for cooling the compressed mass;
   means for draining the by-products of heating including fat, gasses and liquids in the vicinity of the heating zone; and
   means to return said fat, gas and other liquids to the thermo-hardened mass after it has been cooled.

13. The machine as set forth in claim 12, further comprising a means for forming the thermo-hardened mass as a continuous stream through an outlet pipe (9), the outlet of which has a change of direction guide (10) which breaks said stream into conventional pellet lengths, and directs said pellets into a receiving area.

14. The machine as set forth in claim 12, wherein said means for compressing the mass comprises a pelleting unit (3) with a compression chamber (19), at least one nozzle (28), and a piston (21) for compressing the supplied mass (11), wherein said means for heating the compressed mass comprises a heating unit (6) that heats the compressed mass to a temperature level required for activating the thermo-hardening substances in the mass, and wherein said means for cooling the compresses mass comprises a cooling unit (7).

15. The machine as set forth in claim 14, wherein said at least one nozzle (28) is located between said compression chamber and said heating unit.

16. The machine as set forth in claim 15, further comprising a pin (27) which is controlled by at least one of a crank and an eccentric arrangement (17), and which is adapted to push the compressed mass from said compression chamber (19) into said at least one nozzle (28).

17. The machine as set forth in claim 16, wherein said pin (27) forms an extension of said piston (21) which via a cross-pin (20) and a lever (19a) is connected with said crank arrangement (17).

18. The machine as set forth in claim 17, wherein said piston (21) extends into an external piston (24), which is adapted to compress the supplied mass in said compression chamber (19), said pin (27) being disposed through a bore in the top of said external piston (24).

19. The machine as set forth in claim 18, further comprising a spring (23) which has one end supported against a recess (22) on said piston (21) and its other end supported against said external piston (24).

20. The machine as set forth in claim 19. wherein said external piston (24) slides into a cylinder (25) in said pelleting unit (3) and said cross-pin (20) meshes with an extended groove (29) in said external piston (24).

21. The machine as set forth in claim 20, wherein the top of said external piston (24) has a bevel (26) which pushes any excess mass supplied to said compression chamber (19) out of said compression chamber (19).

22. The machine as set forth in claim 21, further comprising:
   a draining device (30) downstream of an outlet of said heating unit (6);
   a filling point (31) downstream of an outlet of said cooling unit (7);
   a connecting pipe (8), wherein said draining device (30) and said filling point (31) are connected to said connecting pipe (8) for conveying melted fat and any other by-products resulting from heating in a path to bypass said cooling unit (7) and to return the by-products back to the mass; and
   an outlet pip (9) connected to said cooling unit (7), through which the mass flows in a continuous stream.

23. The machine as set forth in claim 22, further comprising a change of direction device (10) disposed at the outlet of said outlet pipe (9) which ensures that the stream in said outlet pipe (9) must pass a bend which is sharp enough to break the stream into individual pellets.

24. The machine as set forth in claim 12, further comprising a means to apply the by-products of heating as a coating to said cooled thermo-hardened mass.

* * * * *